US011386624B2

(12) United States Patent
Su et al.

(10) Patent No.: US 11,386,624 B2
(45) Date of Patent: Jul. 12, 2022

(54) ARTIFICIAL INTELLIGENCE AND AUGMENTED REALITY SYSTEM AND METHOD

(71) Applicant: ADAT Technology Co., Ltd., Taipei (TW)

(72) Inventors: Kai-Hung Su, Tainan (TW); I-Chin Lo, Tainan (TW); Yung-Tsen Chen, Tainan (TW); Yung-Hsiang Lin, Tainan (TW)

(73) Assignee: ADAT Technology Co., Ltd., Taipei (TW)

( * ) Notice: Subject to any disclaimer, the term of this patent is extended or adjusted under 35 U.S.C. 154(b) by 229 days.

(21) Appl. No.: 16/846,395

(22) Filed: Apr. 12, 2020

(65) Prior Publication Data

US 2021/0201582 A1 Jul. 1, 2021

(30) Foreign Application Priority Data

Dec. 25, 2019 (TW) ................................. 108147691

(51) Int. Cl.
*G06T 19/00* (2011.01)
*G06F 40/40* (2020.01)
*G06F 40/174* (2020.01)
*G06T 19/20* (2011.01)
*G06V 20/00* (2022.01)

(52) U.S. Cl.
CPC .......... *G06T 19/006* (2013.01); *G06F 40/174* (2020.01); *G06F 40/40* (2020.01); *G06T 19/20* (2013.01); *G06V 20/00* (2022.01)

(58) Field of Classification Search
CPC .... G06F 3/04815; G06F 40/174; G06F 40/40; G06T 19/006; G06T 19/20; G06T 2200/24; G06T 7/70; G06T 2219/2008; G09B 5/02; G06Q 10/063; G06Q 10/0633; G06Q 10/06316
See application file for complete search history.

(56) References Cited

U.S. PATENT DOCUMENTS

| 2018/0130260 | A1 | 5/2018 | Schmirler et al. | |
| 2018/0330531 | A1* | 11/2018 | Mullins | B60R 1/00 |
| 2020/0026257 | A1* | 1/2020 | Dalal | G06T 13/20 |
| 2020/0211413 | A1* | 7/2020 | Zhang | G09B 19/0069 |
| 2020/0334877 | A1* | 10/2020 | Pokorny | G06F 3/147 |
| 2021/0150438 | A1* | 5/2021 | Mehrotra | G06Q 10/06316 |

OTHER PUBLICATIONS

ADAT Technology Co., Ltd., "AIR completes solution for your equipment maintenance without human error risks", http://www.micadat.com/release_8.html, Dec. 4, 2019.

* cited by examiner

*Primary Examiner* — Jin Cheng Wang

(74) *Attorney, Agent, or Firm* — CKC & Partners Co., LLC

(57) ABSTRACT

The invention provides a new software tool for editing standard operating procedures (SOPs). Using an augmented reality (AR) device as a carrier, it integrates resources such as 3D models, voice prompts, videos, photo comparisons, prompt boxes and text descriptions. It also introduces artificial intelligence (AI) with 3D spatial position navigation mechanism and simulation operations reality. Accordingly, it makes editing of SOP easier to use and more intuitive.

7 Claims, 8 Drawing Sheets

| Type | Pattern | Semantic | Example |
|---|---|---|---|
| First Combination: [Core]+0 parameter | [Core] | [Action] [core object] | Tighten the screw |
| Second Combination: [Core]+1 parameter | [Core]+[Tool] | [Action] [core object] using [Tool] | Tighten the screw with/using a torque wrench |
| | [Core]+[Spec] | [Action] [core object] by [Spec] | Tighten the screw by 50 N/m |
| | [Core]+[Conj][Base] | [Action] [core object] [conjunction] [base] | Tighten the screw with/through nut on the panel |
| Third Combination: [Core]+2 parameters | Core+[Tool]+[Spec] | [Action] [core object] using [tool] by [Spec] | Tighten the screw with a torque wrench of 50 N/m |
| | Core+[Tool]+[Conj][Base] | [Action] [core object] [conjunction] [base] using [tool] | Tighten the screw with nut on the panel using a torque wrench |
| | Core+[Spec]+[Conj][Base] | [Action] [core object] by [Spec] [conjunction] [base] | Tighten the screw with nut by 50N/m on the panel |
| Fourth Combination: [Core]+3 parameters | Core+[Tool]+[Spec] +[Conj][Base] | [Action] [core object] by [Spec] [conjunction] [base] using [tool] | Tighten the screw with nut by 50N/m on the panel using a torque wrench |

FIG. 5

ARTIFICIAL INTELLIGENCE AND AUGMENTED REALITY SYSTEM AND METHOD

RELATED APPLICATIONS

This application claims priority to Taiwan Application Serial Number 108147691 filed Dec. 25, 2019, which is herein incorporated by reference.

BACKGROUND

Field of Invention

The present invention introduces artificial intelligence (AI) and augmented reality (AR) devices into editing of a standard operating procedure (SOP) so that the SOP is performed in a completely different way.

Description of Related Art

General operations in a work field rely on professional capabilities of employees to cope with complex work. Skill developments of the employees include basic training, expertise training, on-job training (OTJ). People who have passed the above training and been worked for a period of time should be able to reduce human errors to a certain level, but practically the human errors caused by invalid training still occur frequently. In addition, the employees sometimes need a Standard Operating Procedures (SOP) which is generally described by graphics and texts for various maintenance and assembly. However, the SOP may be written based on people's knowledge, habits, and background knowledge and even the same object may be described differently. Moreover, readers around the world have cultural, educational, and environmental diversities, so their understanding and behavior also vary greatly. In a highly sophisticated and complicated environment, the mistakes caused by the above-mentioned variance cost a lot. A traditional approach is to use SOP documents as teaching materials to train the employees, or the employees may stop to understand the SOP while operating, either of which is a waste of time.

SUMMARY

Embodiments of the disclosure provide an artificial intelligence and augmented reality system including an augmented reality device and a computer system. The computer system provide a user interface to create a project for editing a 3D scene, a check point in the 3D scene, and a prompt content corresponding to the check point. The computer system generates a software module according to the project for the augmented reality device. The augmented reality device executes the software module and determines a position of the augmented reality device in a real environment. When the position of the augmented reality device in the real environment corresponds to the check point, the augmented reality device provides the prompt content.

In some embodiments, the computer system further loads a standard operation procedure file and creates a structured data set including multiple fields. The fields include a core field, a tool field, a specification field, and a conjunction field. The computer system analyzes the standard operation procedure file to obtain a plurality of words from the standard operation procedure file and fill the fields with the words to generate an imperative sentence of the prompt content.

In some embodiments, the imperative sentence belongs to one of combinations. The first combination consists of the core field. The second combination consists of the core field and one of the tool field, the specification field and the conjunction field. The third combination consists of the core field and two of the tool field, the specification field and the conjunction field. The fourth combination consists of the core field, the tool field, the specification field and the conjunction field.

In some embodiments, the imperative sentence includes a verb and a noun. The computer system selects one of candidate prepositions according to a probability of each of the candidate prepositions and a conditional probability of the verb or the noun given that corresponding one of the candidate prepositions occurs as a preposition of the imperative sentence.

In some embodiments, the augmented reality device shows a guiding object according to a distance and a direction between the check point and the position when the position of the augmented reality device in the real environment does not correspond to the check point. The augmented reality device enlarges the guiding object when the position approaches the check point, and reduces a size of the guiding object when the position moves away from the check point.

In some embodiments, the augmented reality device shows a horizontal axis and a vertical axis, shows a current horizontal position and a target horizontal position corresponding to the check point on the horizontal axis, and shows a current vertical position and a target vertical position corresponding to the check point on the vertical axis.

In some embodiments, the augmented reality device captures a real-time image, recognizes an object in the real-time image, and adds a reference image of the object into the real-time image or displays the reference image on a transparent display.

In some embodiments, the prompt content further includes an audio, a video, a text or a perspective image which is related to the object.

From another aspect, an artificial intelligence and augmented reality method for a computer system is provided. The method includes: providing a user interface to create a project for editing a 3D scene, a check point in the 3D scene, and a prompt content corresponding to the check point; generating at least one software module according to the project for an augmented reality device which performs the at least one software module and determines a position of the augmented reality device in a real environment; and providing, by the augmented reality device, the prompt content when the position of the augmented reality device in the real environment corresponds to the check point.

BRIEF DESCRIPTION OF THE DRAWINGS

The invention can be more fully understood by reading the following detailed description of the embodiment, with reference made to the accompanying drawings as follows.

FIG. 5 is a diagram illustrating an exemplar table of sentence patterns in accordance with an embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

The technology proposed in this disclosure combines artificial intelligence (AI) and augmented reality (AR) that can also be referred to AIR. The embodiments disclosed below include AIR design builder (ADB) for users to define a standard operating procedure (SOP) and three-dimensional (3D) models, navigation information, operation flow, remote monitoring, and anomaly detection in the SOP in order to output the SOP to an AR device which may be applied to a variety of fields. The disclosure combines a SOP Upgrade Program Engineering Robot (SUPER) and an AI Model builder (AMB) to provide an AI process optimization robot, that is, an image recognition function of AI is integrated into steps of the SOP. The advantages of the disclosure include minimizing the cognitive load of the SOP and reducing the probability of human error.

Figure 1:
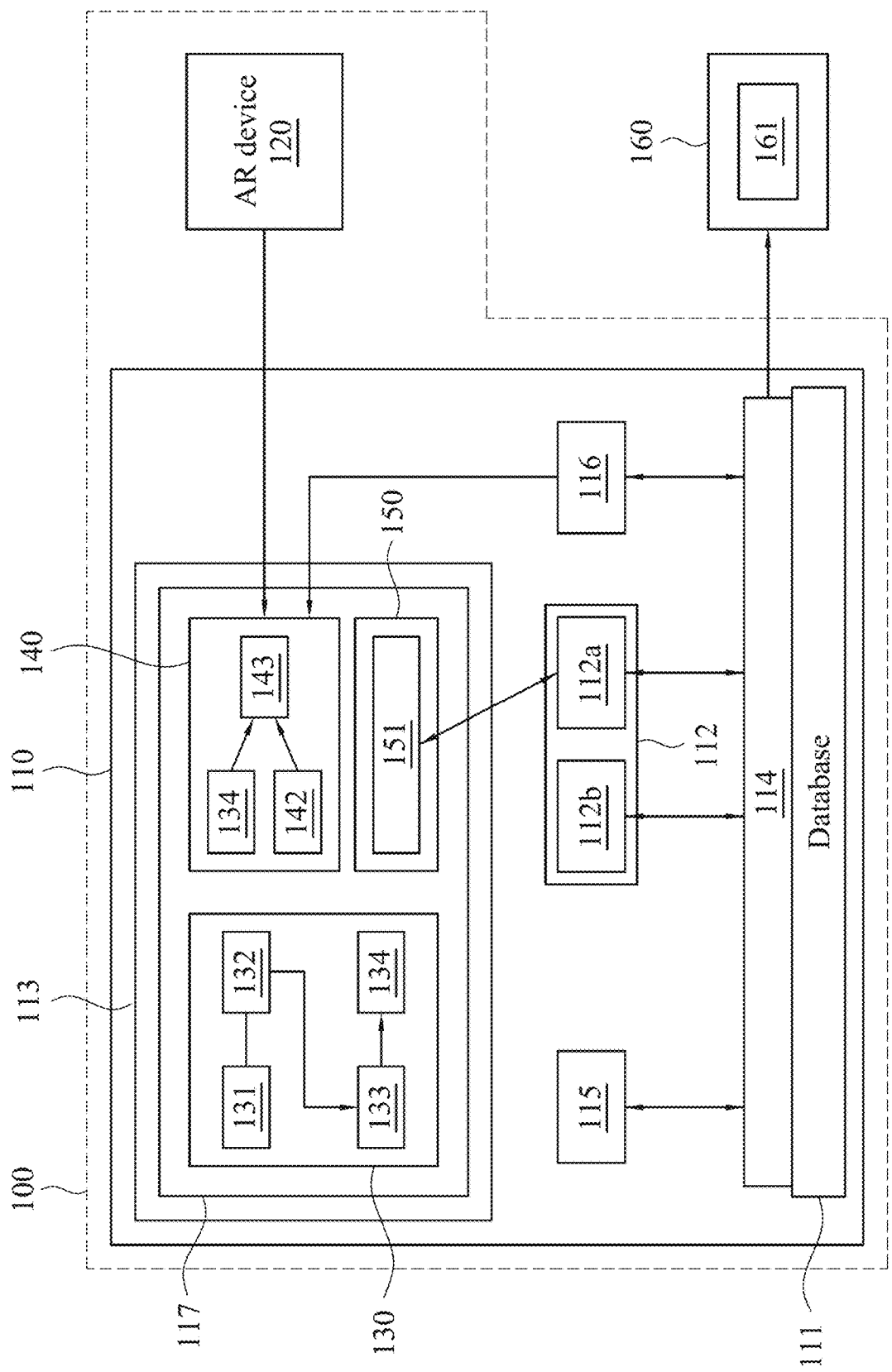
FIG. 1 is a schematic diagram of an AIR system in accordance with an embodiment.

FIG. 1 is a schematic diagram of an AIR system in accordance with an embodiment. Referring to FIG. 1, an AIR system 100 includes a computer system 110 and an AR device 120. The computer system 110 is communicatively connected to the AR device 120 by means such as WiFi, Bluetooth, the Internet, and a local area network. The computer system 110 may include one or more servers and databases. For example, the computer system 110 includes a database 111, an AIR database agent (ADA) 114, an AIR organizer (AO) 115, a SOP module 112, an AIR deploy (AD) 116, and an AI module 113. Herein, each module may include one or more process, library, or cloud service which is executed by the servers in the computer system 110.

The ADA 114 is configured to provide an interface which is accessible by other modules of the computer system 110. The AO 115 is configured to organize data in the database 111. The AD 116 is configured to deploy developed software modules into the database 111, and the software modules will be transmitted to the AR device 120. In some embodiments, a remote device 160 includes an AIR updater (AU) 161 for accessing or updating the data in the database 111. The SOP module 112 includes an AIR SOP printer 112b and an ADB 112a which will be described below.

The AI module 113 includes an AI model builder (AMB) 117 which includes a server 130, a server 140, and a server 150. The server 130 is configured to train an AI model 134 (also referred to a machine learning model). The server 130 includes an expert system 131, a training strategy module 132 and a trainer 133. The training strategy module 132 is configured to determine a data collecting strategy by listing all measureable labels and considering the availability and quantity of the labels. The server 140 is configured to perform inference. The server 140 includes the AI model 134, ADB data 142, and a dashboard interface 143. The server 150 includes a SUPER module 151 for providing the SUPER function.

Figure 2:
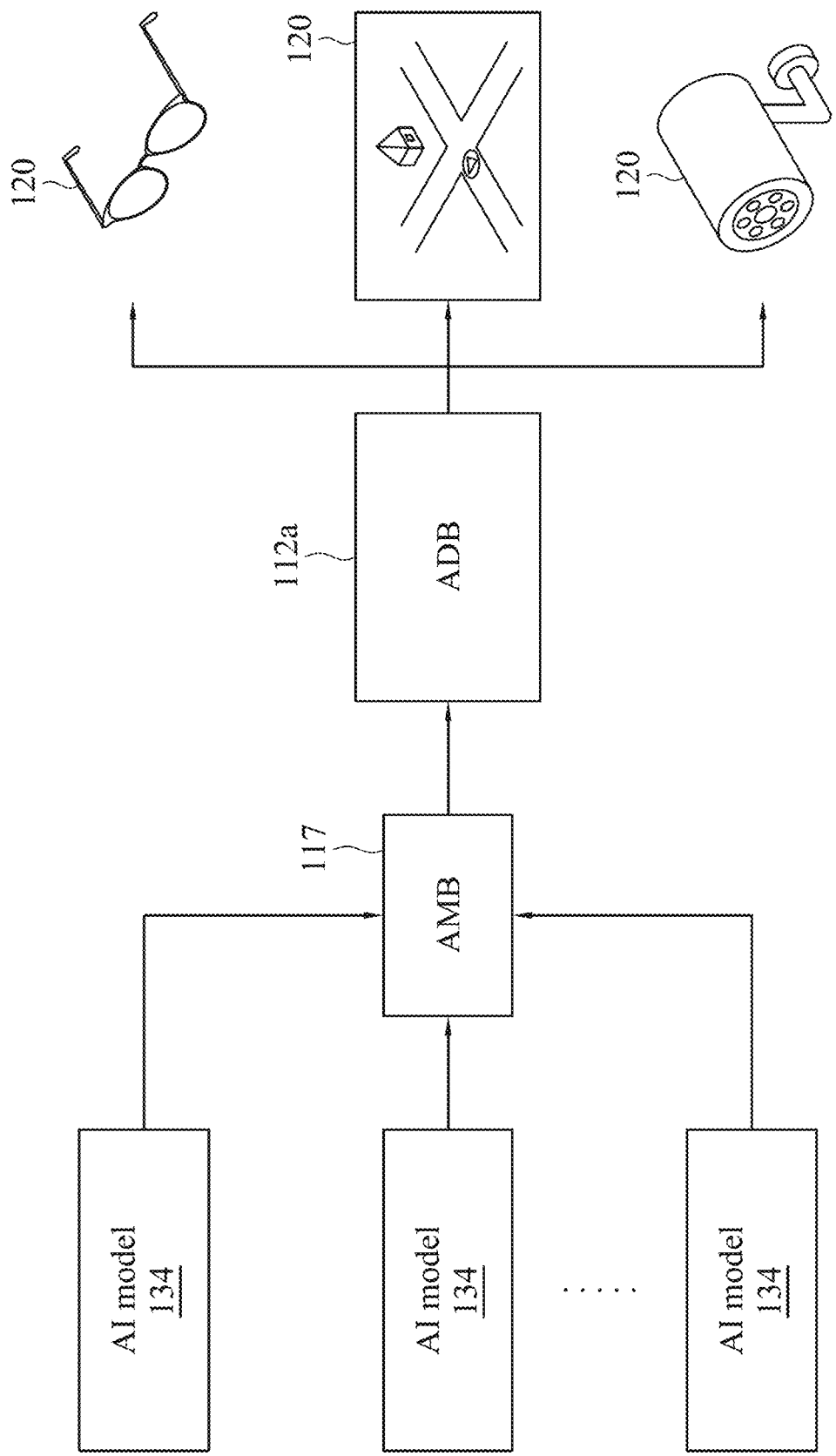
FIG. 2 is a schematic diagram of application of ADB in accordance with an embodiment.

FIG. 2 is a schematic diagram of application of ADB in accordance with an embodiment. Referring to FIG. 2, the AMB 117 is configured to build and manage one or more AI models 134 which are capable of detecting objects, detecting anomalies, identifying root cause, or performing natural language processing which is not limited in the disclosure. The AMB 117 provides the AI models 134 for the ADB 112a which provides a user interface for the user to create a project. The project is used to load or create a SOP. One or more software module will be created according to the SOP and then transmitted to the AR device 120. The software module may include program codes, libraries, or packages which may be developed by any programing language and platforms.

The AR device 120 may be smart glasses, a smart phone, a tablet, or a surveillance system which includes a display, a processor, an inertial measurement unit (IMU), an image sensor, a depth sensor, a wireless communication module, or combination thereof. For example, when the AR device 120 is the smart glasses, it includes a transparent display for the user to see through, and virtual objects such as texts and graphics are shown on the transparent display to generate a mixed scene. When the AR device 120 is the smart phone or the tablet, the image sensor of the AR device 120 captures an image of the real environment that would be displayed on the display of the AR device 120 with some virtual objects. The AR device 120 may calculate a position of itself in the real environment through the IMU. The position may be further corrected by image recognition such as extracting a point cloud of the real environment and comparing it with a point cloud stored in a database to correct the position. When the AR device 120 executes the aforementioned software module, it can provide functions of navigation, voice prompt, text prompt, image prompt, identifying abnormal conditions, and object detection.

Figure 3A:
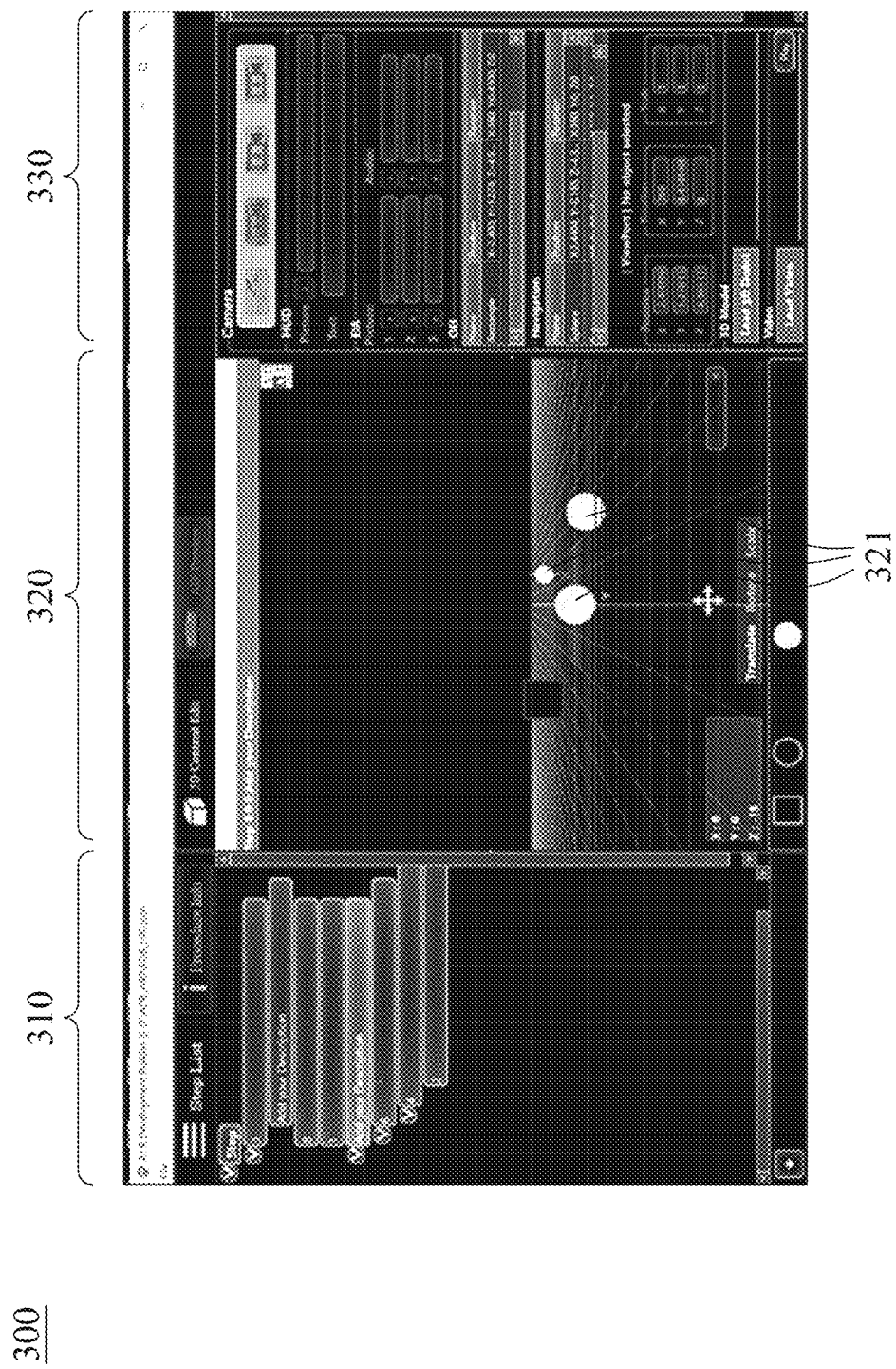
FIG. 3A is a schematic diagram of a user interface in accordance with an embodiment.

The user interface provided by the ADB 112a will be described herein. For simplicity, the operation performed by the ADB 112a and the SUPER module 151 will be referred to operations performed by the computer system 110. FIG. 3A is a schematic diagram of a user interface in accordance with an embodiment. Referring to FIG. 3A, a user interface 300 includes panels 310, 320, and 330 in which the user can create a new project or load an old project. The project is used to edit a SOP which may be related to operations, maintenance, inspection, or installation of a tool machine, but the content of the SOP is not limited in the disclosure. The user can edit information such as program name, program purpose, machine model, working situation, submodule, and software release version. The user can also load a bill of material (BOM) file, an open packaging convention (OPC) file or any suitable file.

The panel 310 is configured to edit the sequence or names of the steps of the SOP. The user can create the steps or load a SOP file from the computer system 110 which would generate a text description of each step in a form of imperative sentence that will be described in detail below. In other words, the panel 310 includes information of step names and step sequences where the user can add, delete, insert, or alter orders of the steps.

A 3D scene corresponding to a real environment (e.g. a factory or a laboratory) is shown in the panel 320. The user can load a 3D model file complying with any conventional industrial standard to create a new 3D scene. 3D models, information of an AR device, and other 3D objects related to the steps of the SOP are shown while editing the steps. The 3D objects may include a 3D model, an overlapping E-Image (OEI), a navigation target, an E-Image Aside (EIA), etc. The user can add, delete, move, rotate, resize, and edit parameters of the 3D objects. The parameters of the 3D objects include positions, rotation angles, and size ratios. The panel 320 also includes check points 321 which are also shown as 3D objects. The user can edit the 3D positions of the check points 321 in the 3D scene by dragging the object with a mouse cursor. Each of the check points 321 indicates a position of the real environment where a user has to move to perform a corresponding step of the SOP.

The panel 330 is used to set a camera perspective (i.e. perspective of the AR device 120) such as a top view, an eagle view, and a side view. The panel 330 may be used to edit the images or texts that the AR device 120 will display, edit ".eia" files, edit navigation coordinates, load 3D models, and load videos, etc. All OEI and navigation targets may be outputted as a table in the panel 330 while editing the texts and images shown on the AR device 120. The user may also set a jump step process in the panel that means the SOP jumps to a specified step when a particular step is performed. In other words, the panel 330 is used to edit a prompt content of each check point 321. The prompt content includes a description of one step in the form of audio, video, text, or image. When determining that its position corresponds to a check point, the AR device 120 shows the prompt content corresponding to the check point.

Figure 3B:
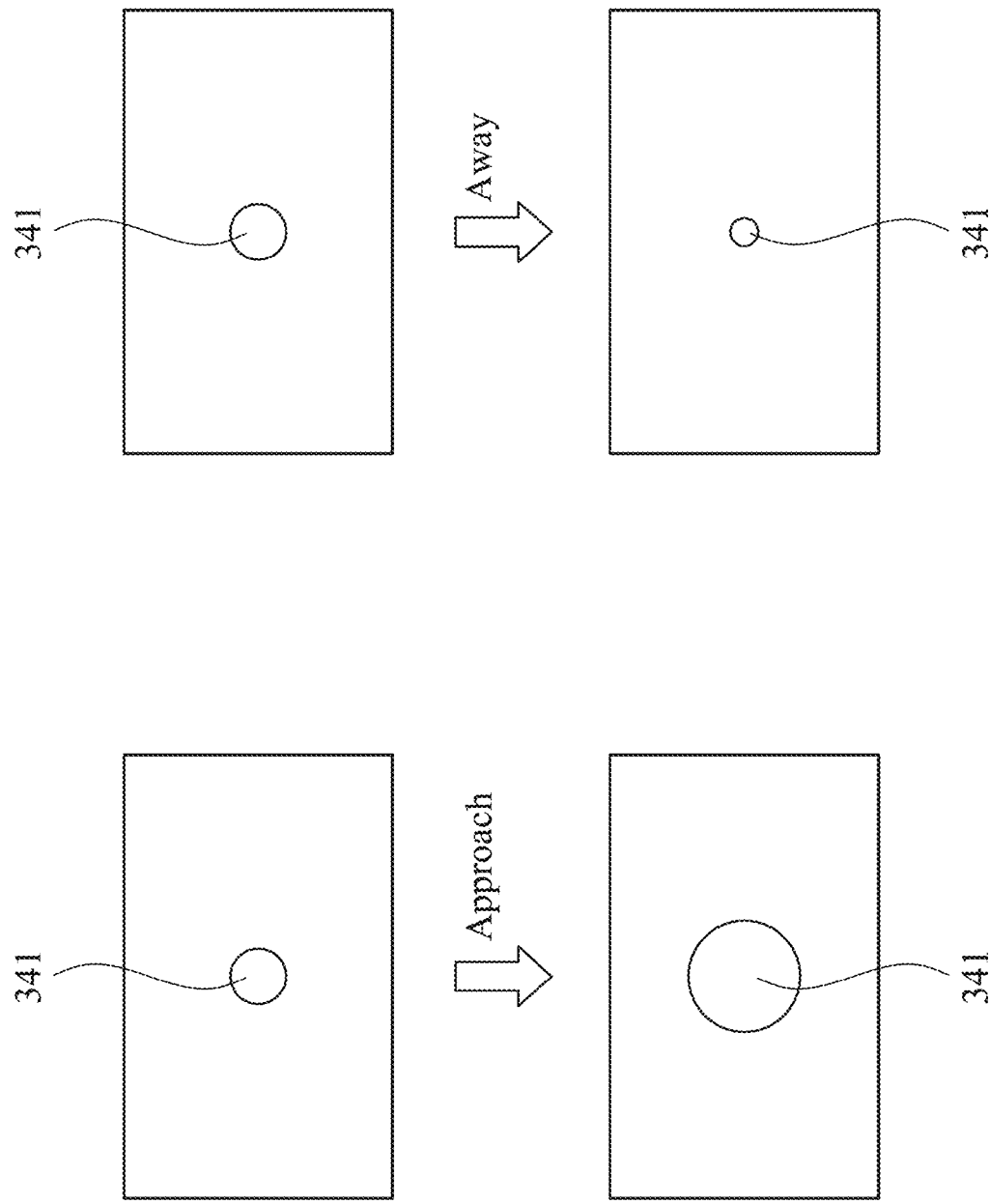
FIG. 3B is a schematic diagram of a guiding object in accordance with an embodiment.

In some embodiments, the computer system 110 creates a guiding object for each of the check points 321, and the guiding object will be shown on the display of the AR device 120. When the position of the AR device 120 in the real environment does not correspond to the next check point 321 where the user should be, the AR device 120 would display the guiding object according to a relative distance and an orientation between the check point 321 and the AR device 120. For example, when the position of itself approaches the check point, the AR device 120 would enlarge the guiding object 341 (as shown in left-hand side of FIG. 3B); and when the position of itself moves away from the check point, the AR device 120 would reduce the size of the guiding object 341 (as shown in right-hand side of FIG. 3B). As a result, the guiding object 341 can guide the user to move toward the check point. The guiding object 341 is a yellow ball in some embodiments, but it may have other shapes and colors in other embodiments.

Figure 3C:
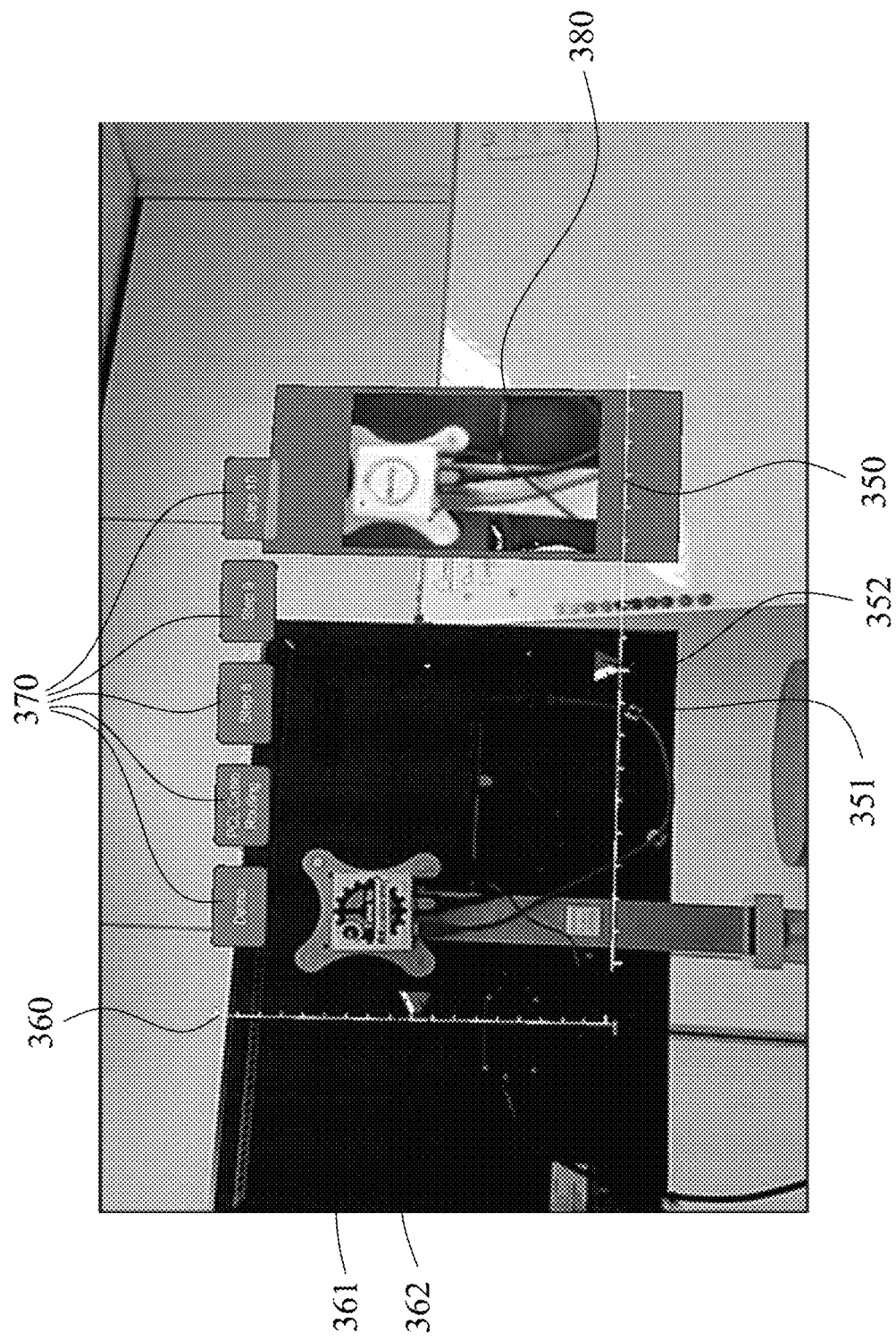
FIG. 3C is a schematic diagram of mixing virtual objects and a reality environment on an AR device in accordance with an embodiment.

FIG. 3C is a schematic diagram of mixing virtual objects and the reality environment on the AR device in accordance with an embodiment. In the embodiment of FIG. 3C, the AR device 120 displays a horizontal axis 350, a vertical axis 360, text boxes 370, and a reference image 380. A current horizontal position 351 of the AR device 120 and a target horizontal position 352 corresponding to the check point where the user should be are shown on the horizontal axis 350 so that the user can be aware whether the check point is located at the left-hand side or the right-hand side. A current vertical position 361 of the AR device 120 and a target vertical position 362 corresponding to the check point where the user should be are shown on the vertical axis 360 so that the user can be aware whether he or she should look up or down.

In some embodiments, the AR device 120 captures a real-time image through its image sensor, recognizes a particular object in the real-time image, obtains a reference image 380 corresponding to the particular object, and add the reference image 380 into the real-time image or displays the reference image 380 on a transparent display to mix the particular object and the reference image 380. As shown in FIG. 3C, the user can compare the object in the real environment with the object in the reference image 380 to, for example, determine if the route of the machine in front is connected correctly. In some embodiments, the AR device 120 may display another perspective image (e.g. back view or side view) of the particular object, and thus the user can see the front view and back view (or side view) of the object at the same time.

The text boxes 370 are configured to show each step of the SOP. The text box corresponding to the currently performed step is highlighted (e.g. change the color or brightness thereof), and accordingly the user can be aware which steps have been done and which steps are yet to be done.

How the computer system 110 automatically analyze the SOP file is described herein. The SOP file may be a ".pdf" file, a ".doc" file, a text file or an image file. The computer system 110 may extract the words from the SOP file directly or by an optical character recognition (OCR) approach. The computer system 110 would classify the words into verbs, nouns, adjective, and adjective verbs, etc. The computer system 110 may adopt any algorithms or libraries of natural language processing to perform word segmentation, tagging and parsing. The adopted library may be Stanford Word Segmenter, CHINESE KNOWLEDGE AND INFORMATION PROCESSING (CKIP), Jieba, etc.

Figure 4:
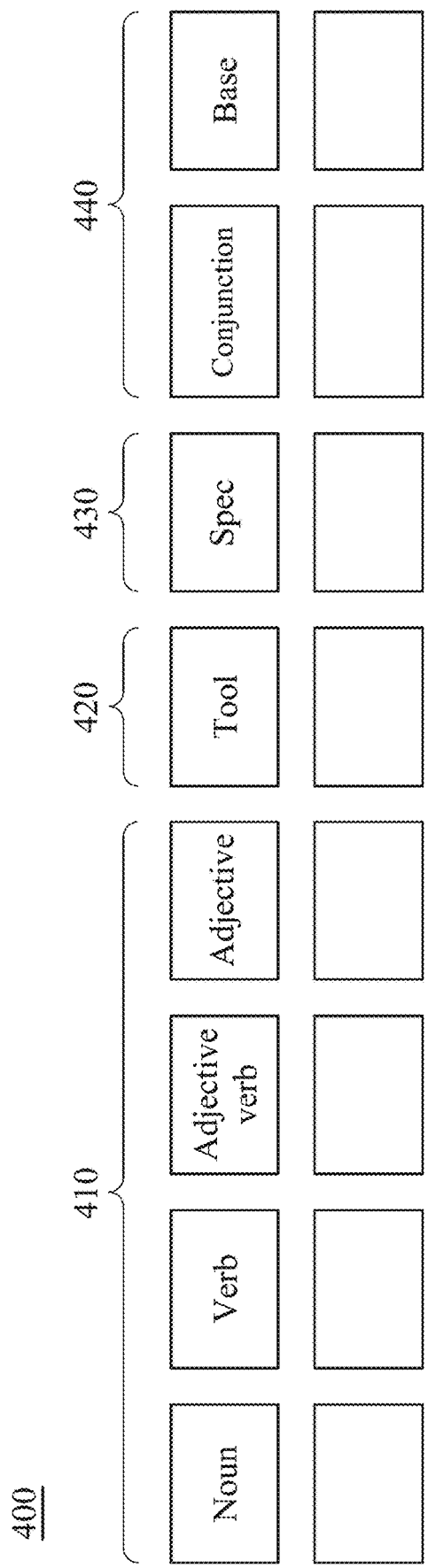
FIG. 4 is a schematic diagram of a structured data set in accordance with an embodiment.

Referring to FIG. 4, the computer system 110 creates a structured data set 400 including a core field 410, a tool field 420, a specification field 430, and a conjunction field 440. The words in the fields refer to semantic roles, and the combinations of the fields refer to semantic patterns. The semantic roles and semantic patters constitute a semantic network. The computer system 110 extracts the words from the SOP file and fill the fields 410, 420, 430, and 430 with the words to generate an imperative sentence as a portion of the aforementioned prompt content. In detail, the core field 410 is filled with nouns, verbs, adjective verbs, and adjectives which are essential roles of a sentence. The tool field 420 is filled with a tool to complete the core. The specification field 430 is filled with the specification of the tool, conjunction or the core. The conjunction field 440 is filled with a conjunction and a base that are grouped together because the conjunction must be used with the base indicating that a core object is connected to the base through the conjunction.

The core filed of the imperative sentence is essential while the other three fields are optional, and accordingly multiple combinations may be generated based the number of the three fields. The first combination consists of the core field. The second combination consists of the core field and one of the three parameters (i.e. the tool field, the specification field, and the conjunction field). The third combination consists of the core field and two of the parameters. The fourth combination consists of the core field, the tool field, the specification field, and the conjunction field. FIG. 5 is a diagram illustrating an exemplar table of sentence patterns in accordance with an embodiment. In FIG. 5, [Core]

represents the core field, [Tool] represents the tool field, [Spec] represents the specification field, [Conj] represents the conjunction, and [Base] represents the base. The first combination includes one pattern, the second combination includes three patterns, the third combination includes three patterns, and the fourth combination has only one pattern.

The step of generating the imperative sentence is described herein. A sentence pattern is selected first by the computer system 110 according to the words extracted from the SOP file. For example, the first sentence pattern of FIG. 5 is selected if a sentence includes only a verb and a subject, and so on. Second, a phrase is generated by adopting a policy of "from short to long" which means the phrase is generated for each semantic role, and then a complete sentence is generated. For example, inputting the noun "screw" and the verb "tighten", a phrase of "tighten the screw" is generated. Third, the phrase is restructured to adjust the sequence of the semantic roles according to the definition of the semantic role based on the selected sentence pattern. The last step is selecting a vocabulary of the preposition with the highest probability based on the context of the phrase to complete the sentence.

In some embodiments, the vocabulary selection is performed to select one of candidate prepositions according to a probability of each candidate preposition and a conditional probability of the verb or the noun of the imperative sentence given that corresponding one of the candidate prepositions occurs as a preposition of the imperative sentence. Bayes' theorem is described herein in brief. A posterior probability is calculated based on a prior probability and a likelihood that is written as the following equation (1).

$$p(\text{prep} \mid x) = \frac{p(\text{prep})p(x \mid \text{prep})}{p(x)} \quad (1)$$

x is the verb and/or noun of the sentence other than the preposition, for example, x=(noun,verb), x=(noun), or x=(verb). The noun refer to the word in the tool field, the specification field and the conjunction field. p(prep) is the probability of a candidate preposition such as "for" and "on" occurring in a sentence. Note that the equation (1) is used to sort the posterior probability of each candidate preposition, but only the portion of the numerator needs to be calculated because the term of p(x) does not affect the sorting result. There are six models to calculate the posterior probabilities. In the first model, only the probability of the preposition is considered, that is, the candidate prepositions are sorted based on p(prep). In the second model, the conditional probability of the verb given that the candidate preposition occurs is considered, that is, the candidate prepositions are sorted based on p(verb|prep). In the third model, the candidate prepositions are sorted based on p(verb|prep)×p(prep). In the fourth model, the conditional probability of the noun given that the candidate preposition occurs is considered, that is, the candidate prepositions are sorted based on p(noun|prep). In the fifth model, the candidate prepositions are sorted based on p(noun|prep)×p(prep). In the sixth model, both of the verb and the noun are considered, that is, the candidate prepositions are sorted based on p(verb, noun-|prep)×p(prep).

In some embodiments, the priority of the above six models is to consider the sixth model first, then the fifth or third model, and finally the first model. To be specific, after filling the structured data set 400 with the words of the SOP file, the computer system 110 determines if the each field of the structured data set 400 is empty. When all fields are filled (i.e. the verb and noun), the sixth model is selected. If the inputted verb is unknown (not in the database), the fifth model is selected. If the inputted noun is unknown, the third model is selected. If both the verb and noun are unknown, then the first model is selected.

In the above-mentioned embodiment, a consistent SOP is outputted by natural language processing through the imperative sentence to reduce the cognitive load of the user. The human error can be reduced due to the lower cognitive load plus AI abnormality detection and the AR device outputting the SOP.

Figure 6:
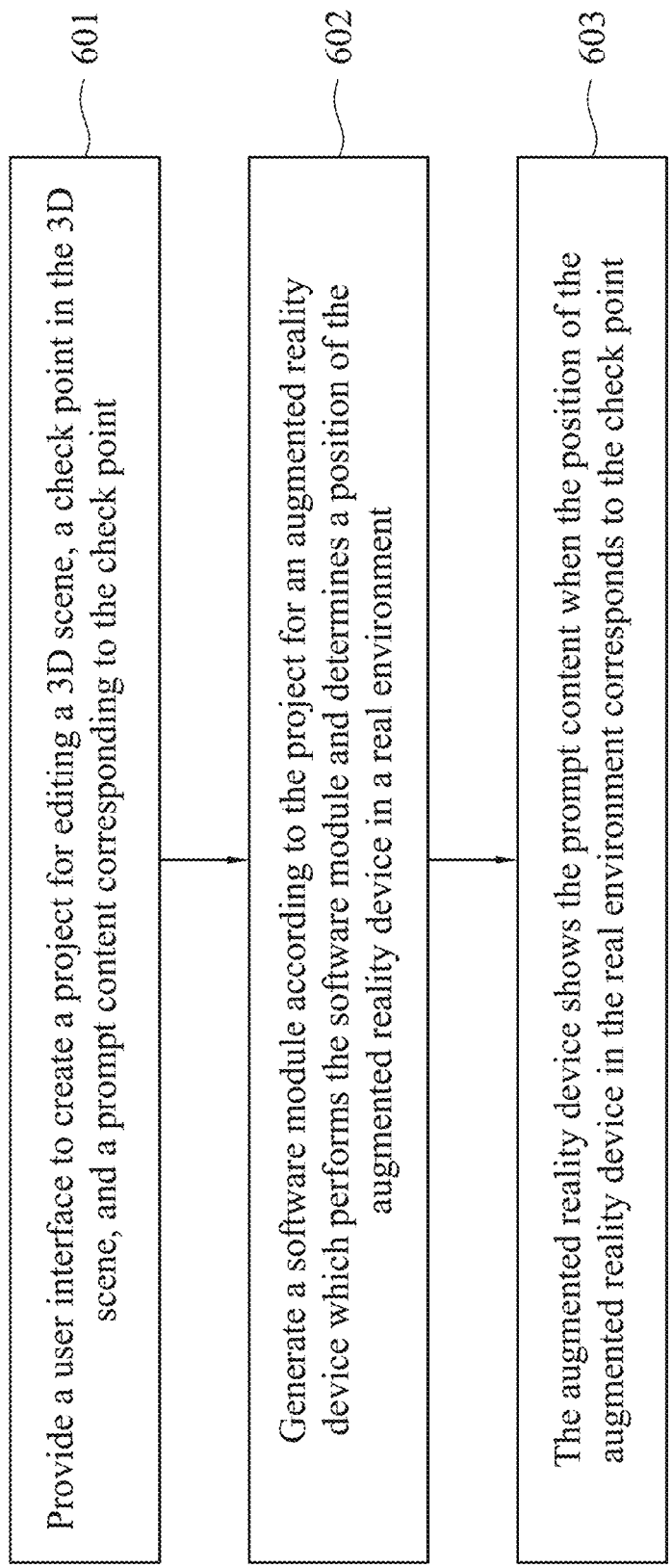
FIG. 6 is a flow chart of an AIR method in accordance with an embodiment.

FIG. 6 is a flow chart of an AIR method in accordance with an embodiment. Referring to FIG. 6, in step 601, a user interface is provide to create a project for editing a 3D scene, a check point in the 3D scene, and a prompt content corresponding to the check point. In step 602, at least one software module is generated according to the project for an augmented reality device which is configured to execute the at least one software module and determine a position of the augmented reality device in a real environment. In step 603, the augmented reality device provides the prompt content when the position of the augmented reality device in the real environment corresponds to the check point. However, all the steps in FIG. 6 have been described in detail above, and therefore the description will not be repeated. Note that the steps in FIG. 6 can be implemented as program codes or circuits, and the disclosure is not limited thereto. In addition, the method in FIG. 6 can be performed with the aforementioned embodiments or can be performed independently. In other words, other steps may be inserted between the steps of the FIG. 6.

The present disclosure proposes an integrated one-stop development tool for functions such as instructing the user through the AR device and the 3D models, navigation, SOP, AI abnormality detection. This tool can be applied to a variety terminal display devices for operation, maintenance, and production of high-value key equipment. The advantages of this disclosure include: 1) the content of a SOP can be refined and optimized, long and unnecessary information is excluded, and only the important information is left, so as to greatly improve the SOP and provide concise and accurate content 2) ability to automatically recommend appropriate verbs and conjunctions based on the context to reduce unnecessary misunderstandings and avoid operational errors; 3) as long as each object is defined, the ADB can use natural language processing technology to automatically generate clear sentences that can be understood by humans.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An artificial intelligence and augmented reality system comprising:
  an augmented reality device; and a computer system, configured to provide a user interface to create a project for editing a 3D scene, a check point in the 3D scene, and a prompt content corresponding to the check point, wherein the computer system is configured to generate a software module according to the project for the augmented reality device, wherein the augmented reality device is configured to execute the at least one software module and determine a position of the augmented reality device in a real environment, wherein when the position of the augmented reality device in the real environment corresponds to the check point, the augmented reality device provides the prompt content, wherein the computer system is further configured to load a standard operation procedure file and create a structured data set comprising a plurality of fields, wherein the fields comprises a core field, a tool field, a specification field, and a conjunction field, wherein the computer system is further configured to analyze the standard operation procedure file to obtain a plurality of words from the standard operation procedure file and fill the fields with the words to generate an imperative sentence of the prompt content, and the imperative sentence comprises a verb and a noun, the computer system is further configured to calculate a posterior probability of each of a plurality of candidate prepositions and select one of the candidate prepositions based on the posterior probability as a preposition of the imperative sentence, wherein if all the fields are filled, the posterior probability of corresponding one of the candidate prepositions is calculated based on $p(verb, noun|prep) \times p(prep)$, wherein if the verb is not in a database, the posterior probability of corresponding one of the candidate prepositions is calculated based on $p(noun|prep) \times p(prep)$, wherein if the noun is not in the database, the posterior probability of corresponding one of the candidate prepositions is calculated based on $p(verb|prep) \times p(prep)$;

wherein if either the verb or the noun is not in the database, the posterior probability of corresponding one of the candidate prepositions is calculated based on $p(prep)$, wherein verb is the verb, noun is the noun, prep is the corresponding one of the candidate prepositions.

2. The artificial intelligence and augmented reality system of claim 1, wherein the imperative sentence belongs to one of a plurality of combinations comprising:

a second combination consisting of the core field and one of the tool field, the specification field and the conjunction field;

a third combination consisting of the core field and two of the tool field, the specification field and the conjunction field; and a fourth combination consisting of the core field, the tool field, the specification field, and the conjunction field.

3. The artificial intelligence and augmented reality system of claim 1, wherein the augmented reality device is configured to show a guiding object according to a distance and an direction between the check point and the position of the augmented reality device when the position in the real environment does not correspond to the check point, wherein the augmented reality device is configured to enlarge the guiding object when the position approaches the check point, wherein the augmented reality device is configured to reduce a size of the guiding object when the position moves away from the check point.

4. The artificial intelligence and augmented reality system of claim 3, wherein the augmented reality device is further configured to show a horizontal axis and a vertical axis, show a current horizontal position and a target horizontal position corresponding to the check point on the horizontal axis, and show a current vertical position and a target vertical position corresponding to the check point on the vertical axis.

5. The artificial intelligence and augmented reality system of claim 4, wherein the augmented reality device is configured to capture a real-time image, recognize an object in the real-time image, and add a reference image of the object into the real-time image or display the reference image on a transparent display.

6. The artificial intelligence and augmented reality system of claim 5, wherein the prompt content further comprises an audio, a video, a text or a perspective image which is related to the object.

7. An artificial intelligence and augmented reality method for a computer system, wherein the artificial intelligence and augmented reality method comprises:

providing a user interface to create a project for editing a 3D scene, a check point in the 3D scene, and a prompt content corresponding to the check point;

generating at least one software module according to the project for an augmented reality device, wherein the augmented reality device is configured to execute the at least one software module and determine a position of the augmented reality device in a real environment;

providing, by the augmented reality device, the prompt content when the position of the augmented reality device in the real environment corresponds to the check point;

loading a standard operation procedure file and creating a structured data set comprising a plurality of fields, wherein the fields comprises a core field, a tool field, a specification field, and a conjunction field;

analyzing the standard operation procedure file to obtain a plurality of words from the standard operation procedure file and filling the fields with the words to generate an imperative sentence of the prompt content, wherein the imperative sentence comprises a verb and a noun; and calculating a posterior probability of a plurality of candidate prepositions and selecting one of the candidate prepositions based on the posterior probability as a preposition of the imperative sentence, wherein if all the fields are filled, the posterior probability of corresponding one of the candidate prepositions is calculated based on $p(verb, noun|prep) \times p(prep)$, wherein if the verb is not in a database, the posterior probability of corresponding one of the candidate prepositions is calculated based on $p(noun|prep) \times p(prep)$, wherein if the noun is not in the database, the posterior probability of corresponding one of the candidate prepositions is calculated based on $p(verb|prep) \times p(prep)$;

wherein if either the verb or the noun is not in the database, the posterior probability of corresponding one of the candidate prepositions is calculated based on p(prep), wherein verb is the verb, noun is the noun, prep is the corresponding one of the candidate prepositions.

\* \* \* \* \*